(12) United States Patent
Lin

(10) Patent No.: US 11,252,187 B2
(45) Date of Patent: *Feb. 15, 2022

(54) ANTI-REPLAY PROCESSING METHOD AND DEVICE UTILIZING THE SAME

(71) Applicant: NANNING FUGUI PRECISION INDUSTRIAL CO., LTD., Nanning (CN)

(72) Inventor: Shih-Neng Lin, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/011,266

(22) Filed: Sep. 3, 2020

(65) Prior Publication Data

US 2020/0404020 A1    Dec. 24, 2020

Related U.S. Application Data

(63) Continuation of application No. 16/180,370, filed on Nov. 5, 2018, now Pat. No. 10,819,743.

(51) Int. Cl.
*H04L 29/06* (2006.01)
*H04L 12/707* (2013.01)

(52) U.S. Cl.
CPC .......... *H04L 63/1466* (2013.01); *H04L 45/22* (2013.01); *H04L 63/1416* (2013.01)

(58) Field of Classification Search
None
See application file for complete search history.

(56) References Cited

U.S. PATENT DOCUMENTS

2016/0277358 A1* 9/2016 Ambati ............... H04L 63/0272
2018/0048567 A1* 2/2018 Ignatchenko ....... H04L 45/3065
2018/0317089 A1* 11/2018 Levesque ............. H04L 9/0819

* cited by examiner

*Primary Examiner* — Andrew J Steinle
(74) *Attorney, Agent, or Firm* — ScienBiziP, P.C.

(57) ABSTRACT

An anti-replay processing method. The method is utilized in a service function path (SFP) to monitor packet count in the SFP to identify replay attack event, and recognizes a segment of the SFP where the replay attack event occurs as an insecure path. The method further initiates a secure path bypassing the insecure path, labels normal SFC packets with an asserted secure flag, and blocks replayed packets without the asserted secure flag at the exit stage of the secure path.

13 Claims, 7 Drawing Sheets

ANTI-REPLAY PROCESSING METHOD AND DEVICE UTILIZING THE SAME

CROSS-REFERENCE TO RELATED APPLICATIONS

The application is a continuation of and claims priority under 35 U.S.C. § 120 to U.S. application Ser. No. 16/180,370, filed Nov. 5, 2018, the entire contents of which are incorporated by reference herein.

BACKGROUND

Technical Field

The disclosure relates to computer techniques, and more particularly to data packet security using anti-replay protection.

Description of Related Art

Network function virtualization (NFV) is becoming a key driver and architecture in many large enterprise networks. Generally, NFV realizes virtualization of certain network functions that would traditionally be implemented as separate network appliances, such as firewalls, accelerators, intrusion detection, load balances, and others.

NFV implementations increasingly employ service function chains (SFC) to control which functions or services are applied to network traffic. Service function chaining enables virtualized networking functions to be implemented as part of a cloud network. A service function chain defines an ordered list of a plurality of service functions that may be applied to packet flows in the network. A packet flow enters the network through a classifier node that generates a service function path for that flow according to the service function chain policy. The classifier node encapsulates each packet of the flow with a network service header that indicates the service functions to which the flow will be subjected, and the order the service functions will be applied.

Hacker may eavesdrop and duplicate SFC packets to generate replayed SFC packets. Anti-replay protection may perform replay checks using an anti-replay window. The performance of such replay checks using the anti-replay window may be subject to window size. For example, the decreased anti-replay window size may be stricter in blocking duplicated packets at the expense of discarding valid packets that arrived out of order and with a sequence number outside of the window.

DETAILED DESCRIPTION

The present disclosure provides an anti-replay processing method executable by an electronic device for network function virtualization (NFV) and service function chain (SFC). The method determines that a packet replay event occurs between a first service function forwarder and a second service function forwarder in a service function path based on the identified abnormal variation between a first packet count received from the first service function forwarder and a second packet count received from the second service function forwarder. The method further responds to the packet replay event by rescheduling an alternative path between the first and second service function forwarders and discriminating normal packets from replayed packets.

Figure 1:
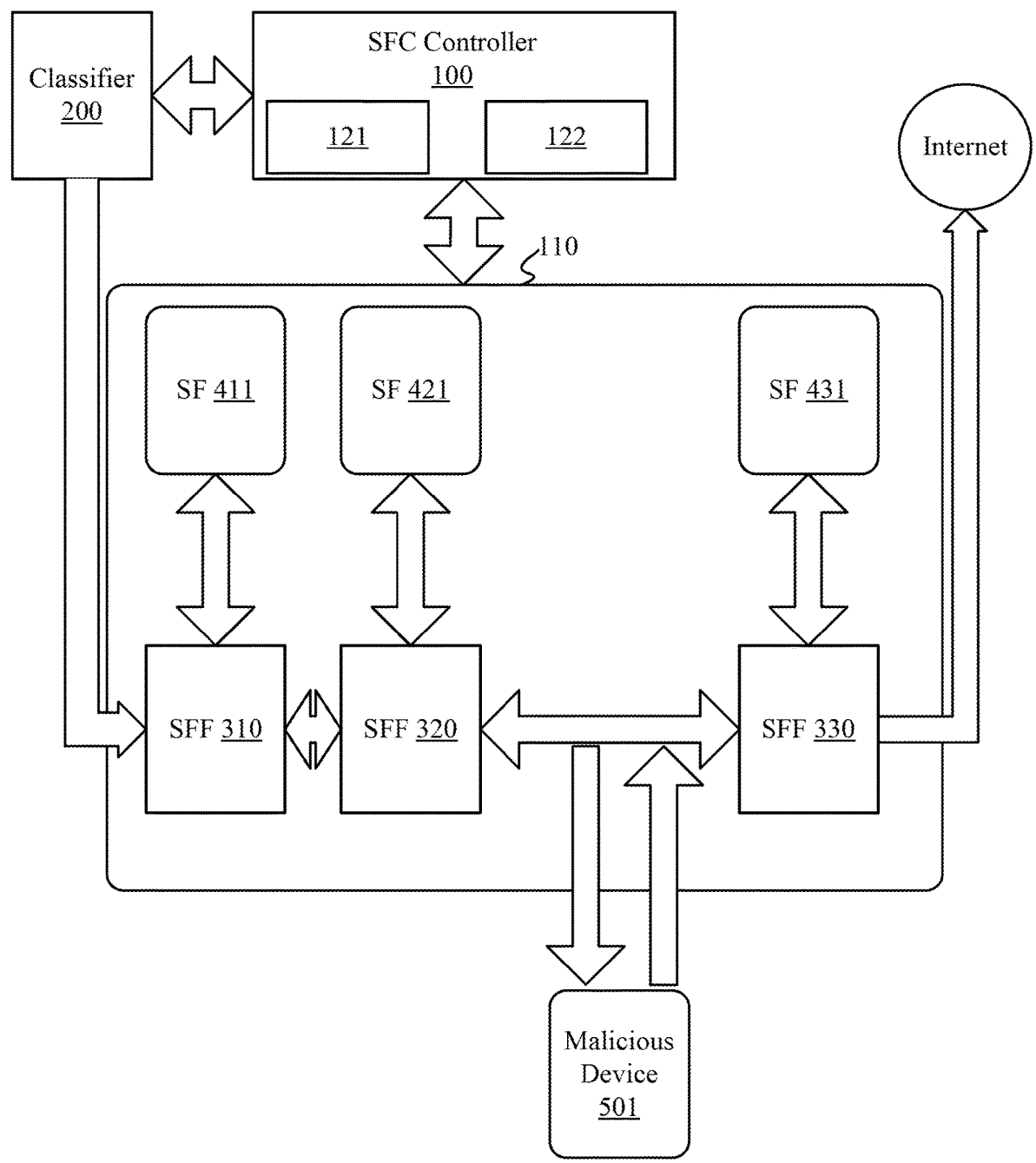
FIG. 1 is a block diagram illustrating an exemplary embodiment of an SFC of the present disclosure.

With reference to FIG. 1, an SFC controller 100 is connected to an SFC classifier 200 and an SF set 110. A classifier is an element that performs a classification function. An exemplary definition of classification function may be referred to as an Internet Engineering Task Force (IETF) RFC 7665. The SFC classifier 200 may initiate a service function path (SFP) as an instance of a service function chain (SFC). An SFP is a mechanism used by service chaining to express the result of applying more granular policy and operational constraints to the abstract requirements of an SFC. In the service function set 110, an SFC classifier 200 is connected to service function forwarders (SFFs) 310, 320, and 330. The SFF 310 is connected to service function (SF) 411. The SFF 320 is connected to SF 421. The SFF 330 is connected to SF 431.

The SFC controller 100 includes an efficient track analyzer (ETA) 121 and a secure path navigator (SPN) 122. The SFC controller 100 may include an exemplary embodiment of a heterogeneous control/policy point as described in RFC 7665. The ETA 121 may collect SFP packet count utilizing SFC protocol or software defined network protocol, such as OpenFlow, to determine whether an SFP or a segment of the SFP suffers from replay attacks. Upon detecting a replay attack event in an SFP, the ETA 121 notifies the SPN 122 to enable a replay protection process. The SPN 122 is notified of the replay attack event and creates a secure path for packets in the SFP to bypass a segment in the SFP where the replay attack event takes place. The SPN 122 further differentiates the normal packets in the SFP from replayed packets such as by labeling normal packets in the SFP and facilitates SFFs to block replayed packets.

Figure 2:
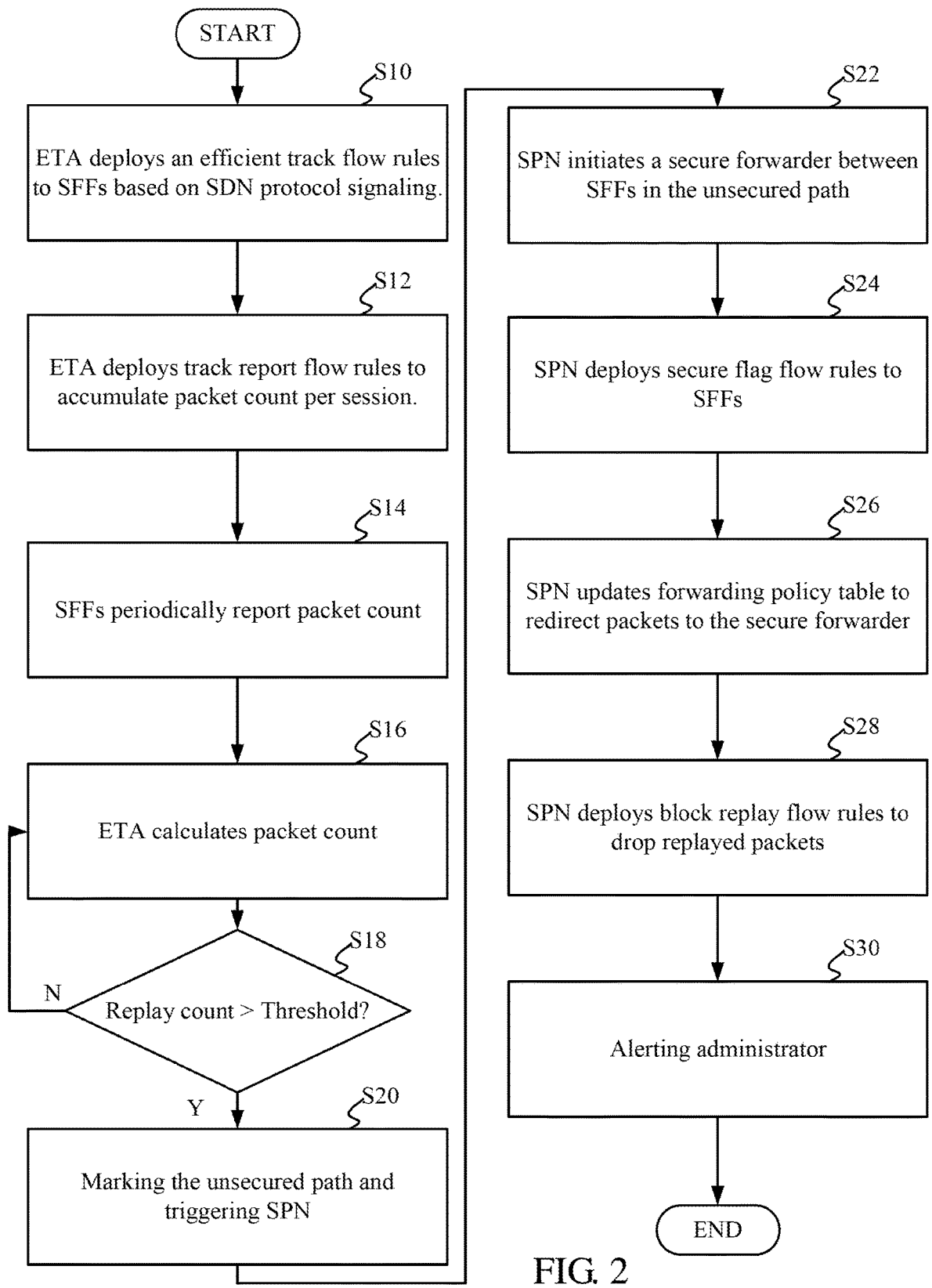
FIG. 2 is a flowchart illustrating an exemplary embodiment of an anti-replay processing method of the present disclosure.
Figure 3:
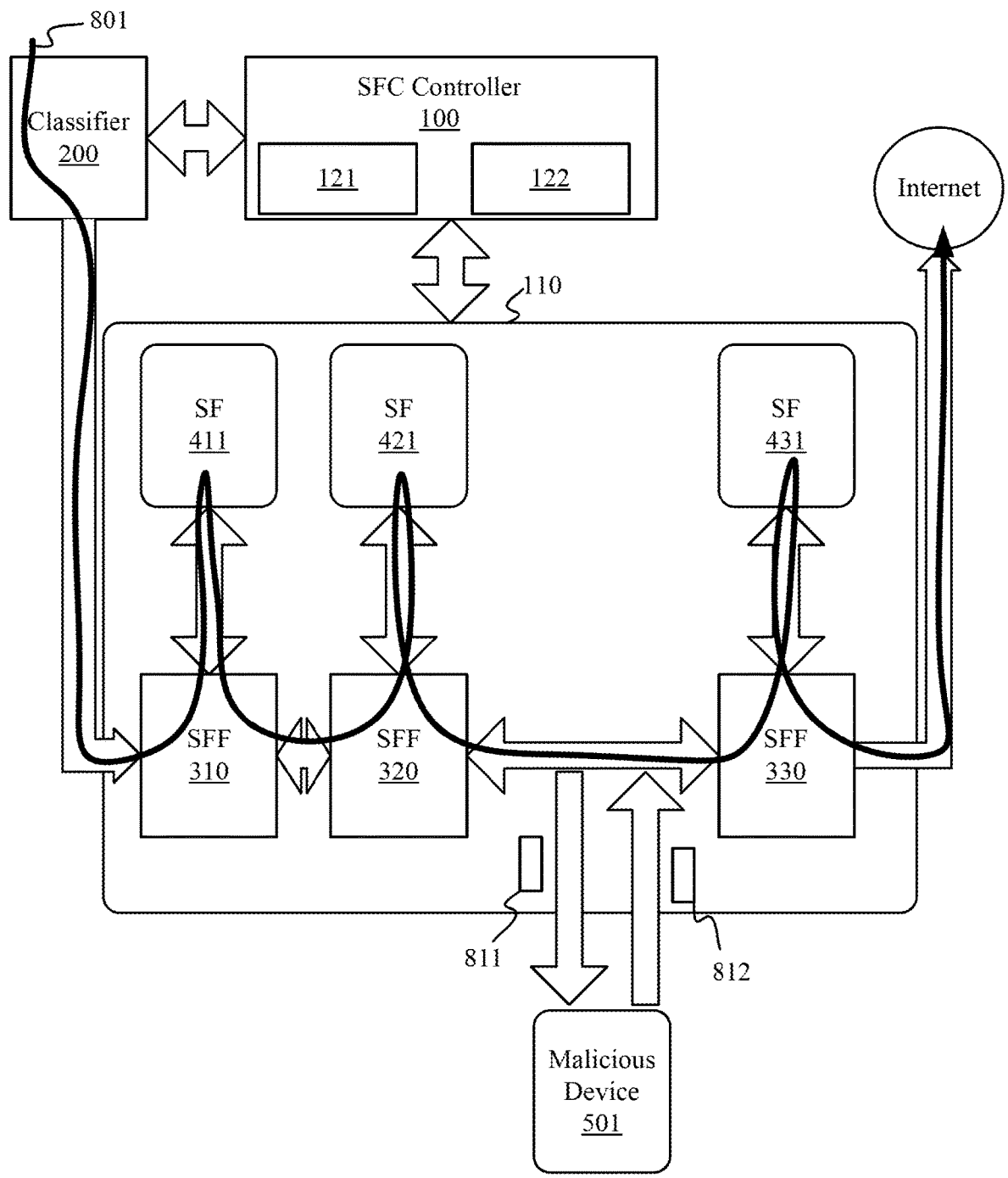
FIG. 3 is a block diagram illustrating an exemplary SFC flow of the present disclosure.

With reference to FIG. 2, the ETA 121 may deploy an efficient track flow (step S10) and a track report flow to the SFFs 310, 320, and 330 based on SFC or SDN protocol signaling (step S12). With reference to FIG. 3, the ETA 121 deploys an SFC packet flow 801 following an SFP. The SFC packet flow 801 travels through the SFP including the classifier 200, the SFF 310, the SF 411, the SFF 310, the SFF 320, the SF 421, the SFF 320, the SFF 330, the SF 431, and the SFF 330 in series and to the Internet. According to the track report flow, the SFFs 310, 320, and 330 periodically report packet count per session in the SFP to the ETA 121 (step S14). The ETA 121 calculates the packet count per session in the SFP (step S16). For example, the ETA 121 records the packet count per session in a data structure which may be represented in Table 1.

TABLE 1

| SFP Stage | Index | Packet Count |
| --- | --- | --- |
| Classifier 200 | $1^{st}$ index | 10000 |
| SFF 310 | $2^{nd}$ index | 10000 |
| SFF 320 | $3^{rd}$ index | 10000 |
| SFF 330 | $4^{th}$ index | 15000 |

Figure 5:
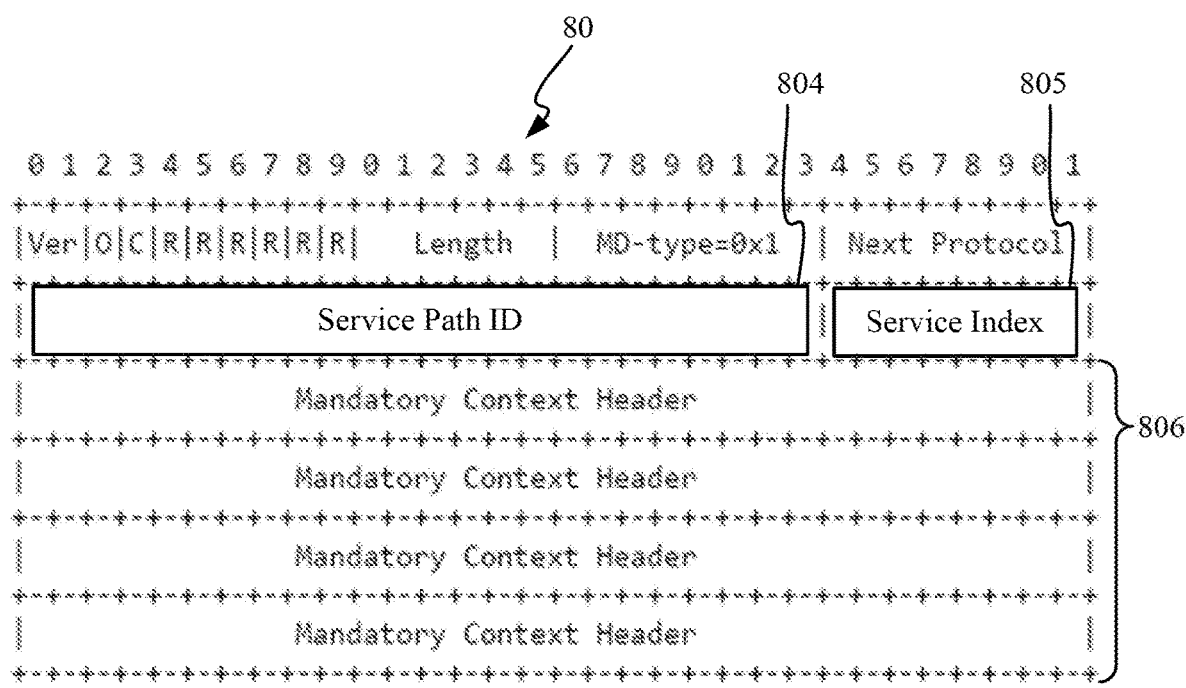
FIG. 5 is a schematic diagram illustrating an SFC packet header.
Figure 6:
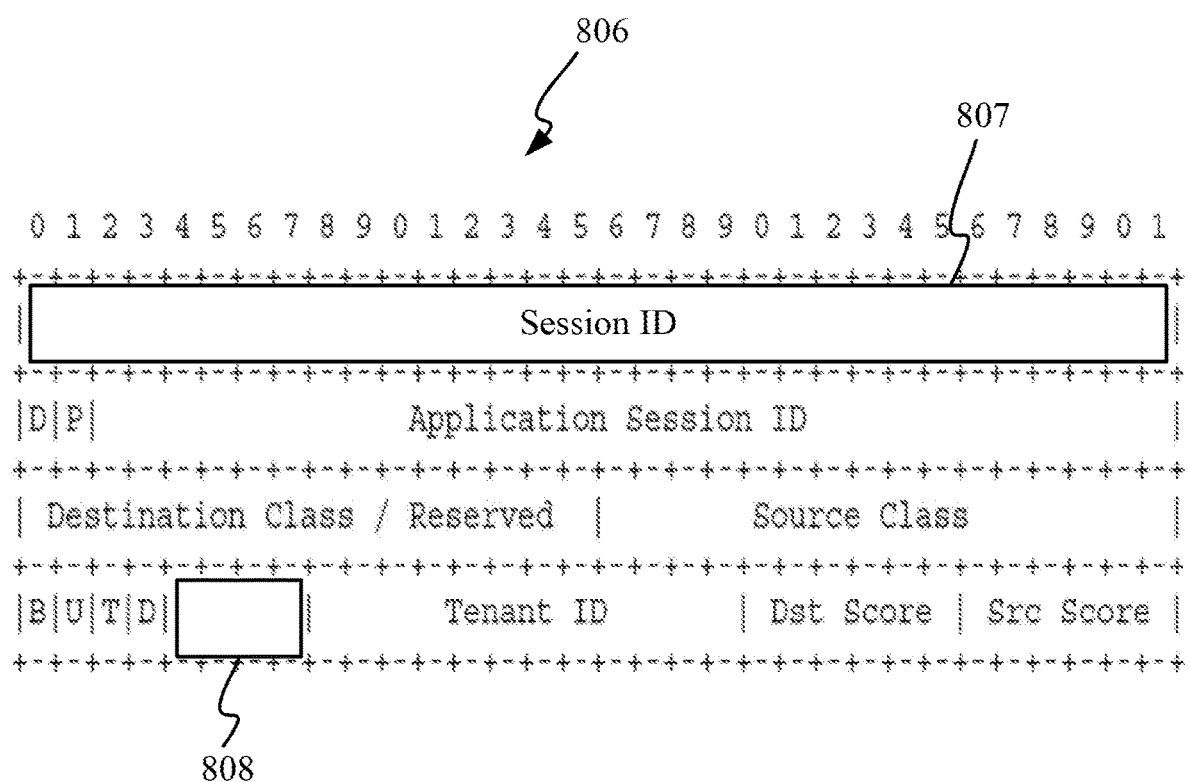
FIG. 6 is a schematic diagram illustrating a reserved field in an SFC packet header.

Each session in the SFP is identified by an index. For example, the index of a session may include a combination of a service path identifier (SPI), a service index (SI), and a session identifier (ID). With reference to FIG. 5, a network service header (NSH) 80 of each packet in flow 801 includes a field 804 for recording an SPI and a field 805 for recording an SI. A field 806 in the NSH 80 may include a plurality of fields as shown in FIG. 6. A field 807 includes a session ID. With reference to Table 1, the ETA 121 calculates and stores a packet count of the classifier 200 up to 10000, a packet count of the SFF 310 up to 10000, a packet count of the SFF 320 up to 10000, a packet count of the SFF 330 up to 15000 in a data structure.

The ETA 121 determines whether any SFP stage has abnormal packet count by determining whether a packet replay count derived from the packet count exceeds a predetermined threshold, such as 1% of the throughput of the SFC flow 801 (step S18). For example, a packet replay count in an SFP stage may be obtained from a packet count of the SFP stage subtracted by a packet count of a previous SFP stage. In a condition where no SFP stage has abnormal packet count, the ETA 121 repeats step S16. In a condition where at least one SFP stage has abnormal packet count, the ETA 121 marks an unsecured path involving the at least one SFP stage that has abnormal packet count and triggers the SPN 122 (step S20).

With reference to FIG. 3, the malicious device 501 eavesdrops packets 811 from the packet flow, replays and directs packets 812 into the flow 801 in the SFP of SF set 110, and causes a replay attack event where the SFF 330 is associated with an abnormal packet count 15000 as shown in Table 1. The packet replay count in the SFF 330 is 5000 obtained from subtracting 15000 by 10000, which exceeds 1% of packet count 10000 of the SFF 320. The ETA 121 marks an unsecured path ranging from the SFF 320 to SFF 330 and notifies the SPN 122 of the unsecured path.

Figure 4:
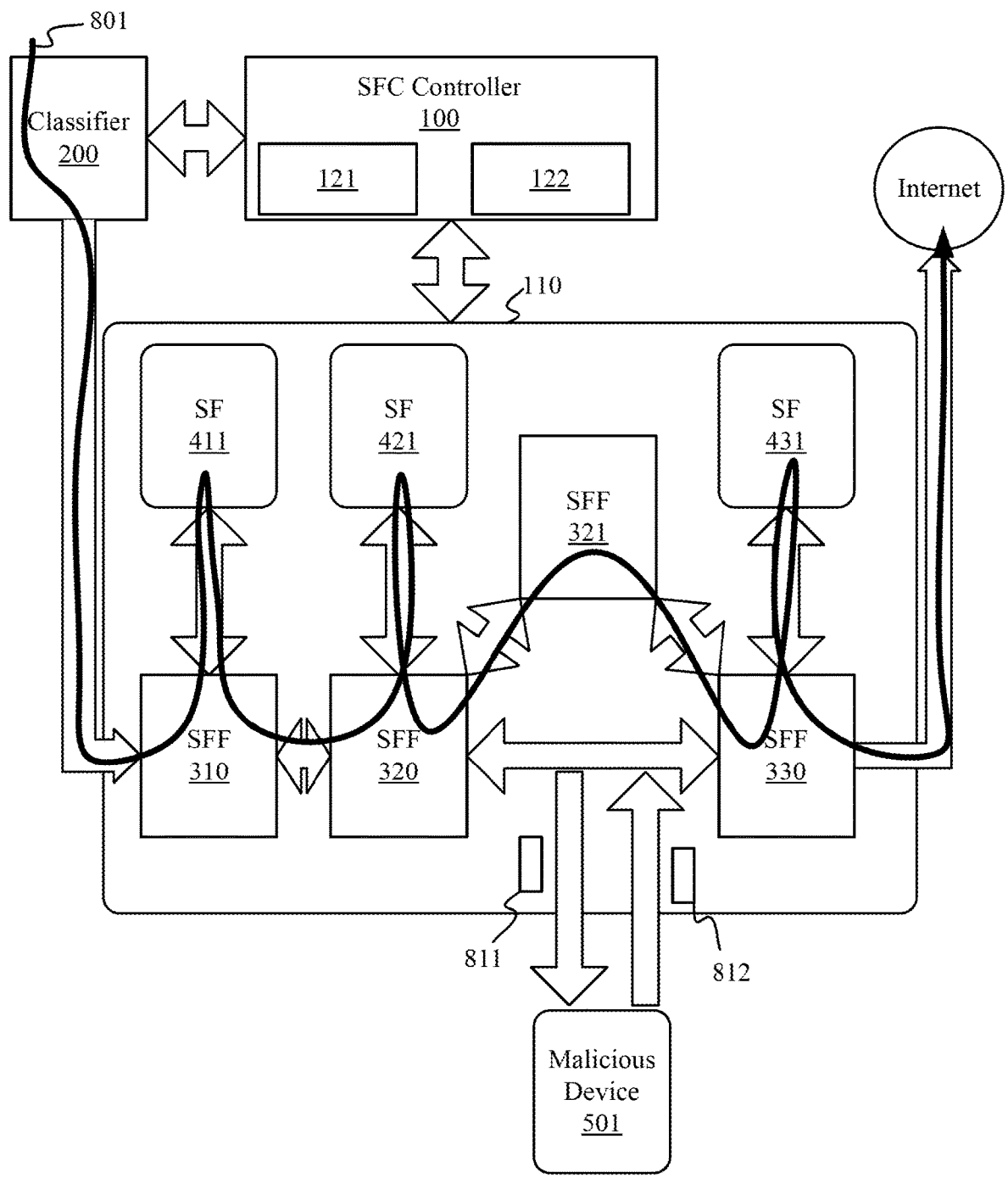
FIG. 4 is a block diagram illustrating an exemplary secure SFC path of the present disclosure.

When the SPN 122 is notified of the unsecured path, the SPN 122 initiates a secure forwarder between two SFFs in the unsecured path (step S22) and deploys secure flag rules to SFFs in the secure path (step S24). With reference to FIG. 4, for example, the SPN 122 initiates a secure service function forwarder 321 between the SFFs 320 and 330 in the unsecured path. The SFF 321 directs traffic of packets of flow 801 from the SFF 321 to the SFF 330. The SPN 122 deploys secure flag rules to the SFFs 320 and 330. The SFF 320, according to the secure flag rules, labels normal packets in the flow 801 by asserting a secure flag in the header of the normal packets. With reference to FIG. 6, for example, the SFF 320 stores a secure flag in a reserved field 808 in the header of each normal packet in the flow 801. In an exemplary embodiment, the SFF 320 utilizes a bit in the field 808 to record a binary 1 as the asserted secure flag, and record a binary 0 as a non-asserted state. In an alternative exemplary embodiment of the present disclosure, the SFF 321, according to the secure flag rules, may label normal packets in the flow 801 by asserting a secure flag in the header of the normal packets to differentiate from replayed packets.

The SPN 122 updates forwarding policy tables in the SFFs to direct normal packets in the flow 801 to travel through the secure path via the secure service function forwarder 321 (step S26). The SPN 122 deploys secure flag rules to SFFs in the secure path (step S24). With reference to FIG. 4, the secure path includes the SFFs 320, 321, and 330. The SPN 122 updates forwarding policy tables in the SFFs 320, 321, and 330 to direct normal packets in the flow 801 to follow the secure path via the secure SFF 321 (step S26). The SPN 122 deploys block rules to SFFs in the secure path to block replayed packets (step S28) and alerts an administrator (step S30). For example, the SPN 122 deploys block rules to SFFs 320, 321, and 330 in the secure path. The SFF 330, according to the block rules, recognizes and blocks packets without the asserted secure flag as replayed packets. Upon receiving a forwarded packet, the SFF 330 forwards the forwarded packet to a next stage in a condition that the forwarded packet includes the secure flag and discards the forwarded packet in a condition that the forwarded packet does not include the secure flag.

By updating forwarding rules in the forwarding policy table in Steps S20-S26, the SPN 122 provides an indication of an alternative route from the SFF 320 to the SFF 330 by replacing an original forwarding rule in the SFF 320 with a new forwarding rule. The original forwarding rule directs traffic of packets in the flow 801 from the SFF 320 to the SFF 330 through an original route. The new forwarding rule directs traffic of packets in the flow 801 from the SFF 320 to the SFF 330 through the alternative route including the secure service function forwarder 321.

Figure 7:
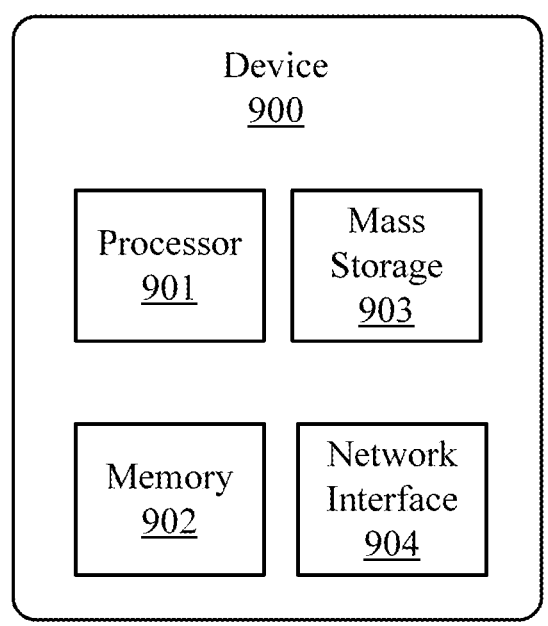
FIG. 7 is a block diagram illustrating an electronic device executing an anti-replay process of the present disclosure.

With reference to FIG. 7, the method of the present disclosure may be implemented by a computer program stored in storage media, such as mass storage 903 in a device 900. The computer program implementing the disclosed method when loaded to a memory 902 by a processor 901 directs the processor 901 in the device 900 to execute the disclosed method. The processor 901 may communicate with other entities through a networking interface 904. Each of the SFC controller, classifiers, SFs, and SFFs in FIG. 1 may be implemented as an exemplary embodiment of the device 900. Alternatively, any combination of the SFC controller, classifiers, SFs, and SFFs in FIG. 1 may simultaneously run in one or more virtual machines in the device 900 or in a plurality of exemplary embodiments of the device 900.

The anti-replay processing method monitors packet count in an SFP to identify replay attack events and recognizes a segment of the SFP where the replay attack event occurs as an insecure path. The method further initiates a secure path bypassing the insecure path, labels normal SFC packets with an asserted secure flag, and blocks replayed packets without the asserted secure flag at the exit stage of the secure path.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An anti-replay processing method executable by an electronic device, comprising:

detecting a packet replay event occurred between a first service function forwarder and a second service function forwarder in a service function path;

initializing a secure service function forwarder between the first service function forwarder and the second service function forwarder in response to the packet replay event; and providing an indication of an alternative route from the first service function forwarder to the second service function forwarder by replacing an original forwarding rule in the first service function forwarder with a new forwarding rule, wherein the original forwarding rule directs traffic of packets of the service function path from the first service function forwarder to the second service function forwarder through an original route, and the new forwarding rule directs traffic of packets of the service function path from the first service function forwarder to the second service function forwarder through the alternative route comprising the secure service function forwarder.

2. The anti-replay processing method of claim 1, wherein the step of detecting a packet replay event occurred between a first service function forwarder and a second service function forwarder in a service function path step further comprises:

determining the packet replay event occurred between the first service function forwarder and the second service function forwarder in the service function path in a condition where a difference between the first packet count received from the first service function forwarder and the second packet count received from the second service function forwarder exceeds a predetermined threshold.

3. The anti-replay processing method of claim 1, wherein the secure service function forwarder directs traffic of packets of the service function path from the secure service function forwarder to the second service function forwarder.

4. The anti-replay processing method of claim 1, further comprising:

differentiating by the first service function forwarder normal packets in the traffic of packets of the service function path from replayed packets.

5. The anti-replay processing method of claim 4, further comprising:

asserting a secure flag in a normal packet in the traffic of packets of the service function path to allow packets with the secure flag to flow through the second service function forwarder and prevent replayed packets from flowing through the second service function forwarder.

6. The anti-replay processing method of claim 5, further comprising:

setting a reserved bit in a network service header of the normal packet in the traffic of packets of the service function path to assert the secure flag.

7. The anti-replay processing method of claim 5, further comprising:

allowing the second service function forwarder to receive a forwarded packet;

allowing the second service function forwarder to forward the forwarded packet in a condition where the forwarded packet comprises the secure flag asserted; and allowing the second service function forwarder to discard the forwarded packet in a condition where the forwarded packet does not comprise the secure flag asserted.

8. The anti-replay processing method of claim 1, further comprising:

utilizing a packet count track table to determine the packet replay event;

wherein a first record of the packet count track table comprises a first service path identifier, a first service index, and a first session identifier, and the first packet count associated with the first service path identifier, the first service index and the first session identifier; and wherein a second record of the packet count track table comprises a second service path identifier, a second service index, and a second session identifier, and the second packet count associated with the second service path identifier, the second service index and the second session identifier.

9. An anti-replay processing method executable by an electronic device, comprising:

detecting a packet replay event occurred between a first service function forwarder and a second service function forwarder in a service function path;

receiving an indication stating a secure service function forwarder initialized between the first service function forwarder and the second service function forwarder in response to the packet replay event; and providing an indication of an alternative route toward the second service function forwarder by replacing an original forwarding rule in the first service function forwarder with a new forwarding rule, wherein the original forwarding rule directs traffic of packets of the service function path from the first service function forwarder to the second service function forwarder, and the new forwarding rule directs traffic of packets of the service function path from the first service function forwarder to the secure service function forwarder rather than the second service function forwarder.

10. The anti-replay processing method of claim 9, wherein the secure service function forwarder directs traffic of packets of the service function path from the secure service function forwarder to the second service function forwarder.

11. The anti-replay processing method of claim 9, further comprising:

differentiating by the first service function forwarder normal packets in the traffic of packets of the service function path from replayed packets.

12. The anti-replay processing method of claim 11, further comprising:

asserting a secure flag in a service function flow packet in the traffic of packets of the service function path to allow packets with the secure flag to flow through the second service function forwarder and prevent replayed packets from flowing through the second service function forwarder.

13. The anti-replay processing method of claim 11, further comprising:

setting a reserved bit in a network service header of the service function flow packet to assert the secure flag.

* * * * *